United States Patent
Kim

(10) Patent No.: US 9,061,314 B2
(45) Date of Patent: Jun. 23, 2015

(54) VACUUM CHAMBER SYSTEM OF COATING APPARATUS AND COATING METHOD USING THE SAME

(75) Inventor: Tae-Sung Kim, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 1120 days.

(21) Appl. No.: 13/035,554

(22) Filed: Feb. 25, 2011

(65) Prior Publication Data

US 2012/0034380 A1   Feb. 9, 2012

(30) Foreign Application Priority Data

Aug. 3, 2010  (KR) .................. 10-2010-0074957

(51) Int. Cl.
 *B05C 5/02* (2006.01)
 *H01M 4/04* (2006.01)
 *B05D 1/26* (2006.01)

(52) U.S. Cl.
CPC ............... *B05C 5/0254* (2013.01); *B05D 1/26* (2013.01); *B05D 2252/02* (2013.01); *H01M 4/0404* (2013.01)

(58) Field of Classification Search
None
See application file for complete search history.

(56) References Cited

U.S. PATENT DOCUMENTS

| | | | |
|---|---|---|---|
| 4,128,667 A | 12/1978 | Timson | |
| 4,408,562 A | 10/1983 | DeCamp et al. | |
| 4,675,230 A * | 6/1987 | Innes | 427/280 |
| 5,042,518 A * | 8/1991 | Singhe et al. | 137/2 |
| 5,240,502 A | 8/1993 | Castaldo et al. | |
| 5,447,254 A | 9/1995 | Hoover et al. | |
| 5,618,568 A | 4/1997 | Krupa et al. | |
| 5,720,820 A | 2/1998 | Boger et al. | |
| 2001/0043993 A1 | 11/2001 | Ogawa | |
| 2006/0068114 A1 | 3/2006 | Hasegawa et al. | |

FOREIGN PATENT DOCUMENTS

| | | |
|---|---|---|
| CN | 101288866 A | 10/2008 |
| JP | 2006-095456 A | 4/2006 |

(Continued)

OTHER PUBLICATIONS

Extended European Search Report dated Dec. 16, 2011, for corresponding EP Application No. 11172603.0.
Korean Notice of Allowance dated Oct. 5, 2012 for Korean Patent Application No. KR 10-2010-0074957 which corresponds to captioned U.S. Appl. No. 13/035,554.

(Continued)

*Primary Examiner* — Charles Capozzi
(74) *Attorney, Agent, or Firm* — Knobbe Martens Olson & Bear LLP

(57) ABSTRACT

There are provided a vacuum chamber system of a coating apparatus and a coating method using the same that prevents the attraction phenomenon of a coating solution in intermittent coating, so that the failure rate of coating is reduced, thereby improving the quality of products. In one embodiment, a vacuum chamber system of a coating apparatus includes a vacuum chamber connected to a coating solution outlet of the coating apparatus. A sound pressure generating unit is connected to one region of the vacuum chamber to generate sound pressure. A buffer tank is provided between the vacuum chamber and the sound pressure generating unit. In the vacuum chamber system, a control unit is further provided between the vacuum chamber and the buffer tank. The control unit controls air to be selectively inhaled or blocked from the vacuum chamber and the sound pressure generating unit.

7 Claims, 4 Drawing Sheets

(56) References Cited

FOREIGN PATENT DOCUMENTS

| JP | 2006-156232 A | 6/2006 |
| JP | 2006-272269 A | 10/2006 |
| JP | 4195832 B2 | 10/2008 |
| JP | 2009-028605 A | 2/2009 |
| KR | 10-2011-0002935 A | 1/2011 |
| WO | WO 91/14969 | 10/1991 |

OTHER PUBLICATIONS

Japanese Office Action dated Oct. 16, 2012 for Japanese Patent Application No. JP 2010-232528 which shares priority of Korean Patent Application No. KR 10-2010-0074957 with captioned U.S. Appl. No. 13/035,554.

Office Action dated Sep. 18, 2013 for corresponding CN Application No. 201110087238.9.

* cited by examiner

VACUUM CHAMBER SYSTEM OF COATING APPARATUS AND COATING METHOD USING THE SAME

RELATED APPLICATIONS

This application claims priority to and the benefit of Korean Patent Application No. 10-2010-0074957, filed on Aug. 3, 2010, in the Korean Intellectual Property Office, the entire content of which is incorporated herein by reference.

BACKGROUND

1. Field

An aspect of the present invention relates to a vacuum chamber system of a coating apparatus and a coating method using the same, and more particularly, to a vacuum chamber system of a coating apparatus and a coating method using the same that can improve the quality of products.

2. Description of the Related Art

In general, a coating apparatus includes a coating solution inlet and a coating solution outlet. If a coating solution is supplied to the coating solution inlet of the coating apparatus, it is sprayed through the coating solution outlet along a coating solution flow path. In this instance, coating is performed while a base material is transferred in one direction at the side of the coating solution outlet.

When thin-film coating or high-speed coating is performed in the coating of the base material, a coating bead of the coating solution is pushed from an upstream side to a downstream side in the direction in which the coating is performed with respect to the base material. Therefore, the shape of the coating bead is modified, and accordingly, the coating may not be performed.

SUMMARY

In one embodiment, there are provided a vacuum chamber system of a coating apparatus and a coating method using the same that includes a control unit for controlling air to be selectively inhaled into a vacuum chamber attached to the coating apparatus and a buffer tank, thereby preventing the attraction phenomenon of a coating solution in intermittent coating.

According to an aspect of the present invention, there is provided a vacuum chamber system of a coating apparatus, the system including: a vacuum chamber connected to a coating solution outlet of the coating apparatus; a sound pressure generating unit connected to one region of the vacuum chamber to generate sound pressure; and a buffer tank provided between the vacuum chamber and the sound pressure generating unit, wherein a control unit is further provided between the vacuum chamber and the buffer tank, and the control unit controls air to be selectively inhaled into or blocked from the vacuum chamber and the sound pressure generating unit.

The control unit may be formed with first and second control units that control the air to be independently inhaled into or blocked from the vacuum chamber and the sound pressure generating unit.

The control unit may be formed as a 3-way switching valve.

The 3-way switching valve may be operated automatically or manually.

The buffer tank may temporarily absorb the pressure sound generated from the sound pressure generating unit in the operation of the control unit.

The sound pressure generating unit may be formed as a fan.

An intermittent unit for opening/closing the coating solution outlet may be further formed at the coating solution outlet.

The coating apparatus may be used when an active material slurry is coated on a metal base material of a secondary battery.

According to an aspect of the present invention, there is provided an intermittent coating method using the vacuum chamber system of the coating apparatus, the method including: forming a coating portion by controlling the first and second control units in the state that the air is blocked from the vacuum chamber and the sound pressure generating unit so that sound pressure is operated to the vacuum chamber; and forming a non-coating portion by controlling the first and second control units in the state that the air is independently inhaled to the vacuum chamber and the sound pressure generating unit.

In the forming of the coating portion, the first control unit may control the vacuum chamber and the sound pressure generating unit to be connected to each other.

In the forming of the coating portion, the second control unit may control the vacuum chamber and the sound pressure generating unit to be connected to each other.

In the forming of the non-coating portion, the first control unit may control the air to be inhaled to the vacuum chamber while blocking the vacuum chamber and the sound pressure generating unit.

In the forming of the non-coating portion, the second control unit may control the air to be inhaled to the sound pressure generating unit while blocking the vacuum chamber and the sound pressure generating unit.

As described above, according to embodiments of the present invention, the attraction phenomenon of a coating solution is prevented in intermittent coating, so that the failure rate of coating can be reduced, thereby improving the quality of products. Also, the intermittent coating is smoothly performed, thereby enhancing productivity.

BRIEF DESCRIPTION OF THE DRAWINGS

The accompanying drawings, together with the specification, illustrate exemplary embodiments of the present invention, and, together with the description, serve to explain the principles of the present invention.

DETAILED DESCRIPTION

Figure 1:
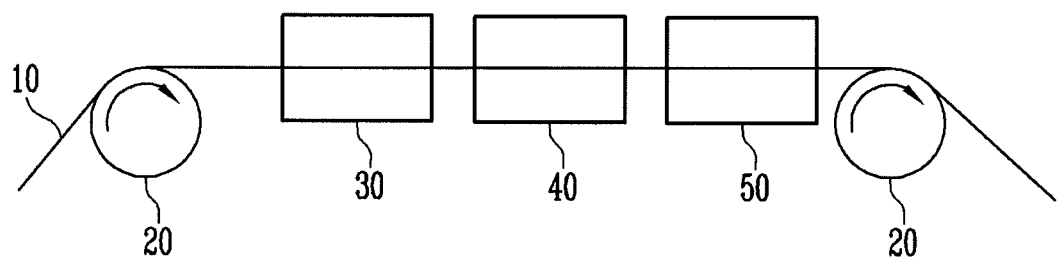
FIG. 1 is a schematic process view showing a process of preparing a coating material using a coating apparatus having a vacuum chamber system attached thereto according to an embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. In addition, when an element is referred to as being "on" another element, it can be directly on the another element or be indirectly on the another element with one or more intervening elements interposed therebetween. Also, when an element is referred to as being "connected to" another element, it can be directly connected to the another element or be indirectly connected to the another element with one or more intervening elements interposed therebetween. Hereinafter, like reference numerals refer to like elements.

Hereinafter, a vacuum chamber system of a coating apparatus and a coating method using the same according to embodiments of the present invention will be described in detail with reference to the accompanying drawings.

FIG. 1 is a schematic process view showing a process of preparing a coating material using a coating apparatus having a vacuum chamber system attached thereto according to an embodiment of the present invention.

Referring to FIG. 1, a base material 10 wound around rolls 20 at both sides thereof is mounted to be continuously transferred. A coating apparatus 30, a drying apparatus 40 and a slitting apparatus 50 are sequentially mounted over the base material 10. The coating apparatus 30 according to this embodiment may be used in various fields. However, a coating apparatus for coating an active material slurry on a metal base material of a secondary battery will be described in the following embodiments.

First, a binder solution is made by mixing a binder with a solvent, and then an active material slurry is then prepared by mixing an active material and a conductive or additive agent in the binder solution. Subsequently, the active material slurry is coated on the base material 10 using the coating apparatus 30 and then dried using the drying apparatus 40. After rolling is performed so as to increase the capacity density of the active material, slitting is performed using the slitting apparatus 50, thereby obtaining a coating base material with a constant width.

Here, the active material slurry refers to a state that it contains the solvent, and the active material refers to a state where the solvent is removed from the active material slurry by drying the active material slurry.

Figure 2A:
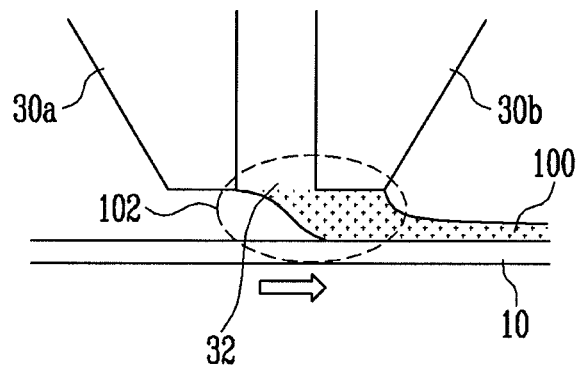
FIG. 2A is a sectional view showing a state that the shape of a coating bead is modified in thin-film or high-speed coating.
Figure 2B:
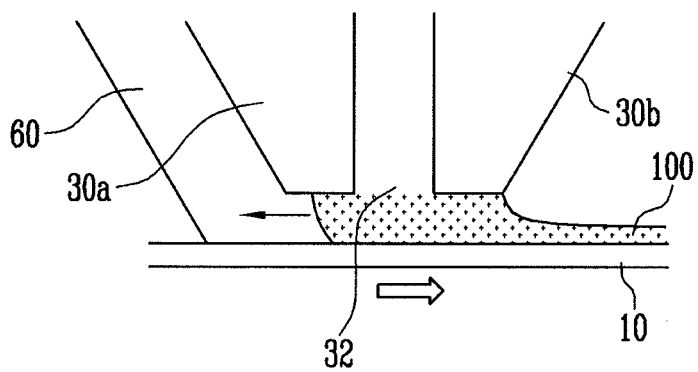
FIG. 2B is a sectional view showing a state that sound pressure is generated in the coating bead using a vacuum chamber.

FIG. 2A is a sectional view showing a state that the shape of a coating bead is modified in thin-film or high-speed coating. FIG. 2B is a sectional view showing a state that sound pressure is generated in the coating bead using a vacuum chamber.

Referring to FIGS. 2A and 2B, thin-film or high-speed coating may be performed using body portions 30a and 30b (see FIG. 4) of a coating apparatus such as a slot die. In this instance, a coating bead of a coating solution 100 sprayed through a coating solution outlet 32 formed between the body portions 30a and 30b of the coating apparatus is pushed from an upstream side to a downstream side in the direction in which the base material 10 is advanced. When the coating is performed using the body portions 30a and 30b of the coating apparatus, modifications 102 may occur in the shape of the coating bead.

In order to prevent such a problem, a vacuum chamber 60 may be provided to pull the coating bead to the upstream side. Sound pressure is operated to the interior of the vacuum chamber 60 so that the coating bead is normally formed. A buffer tank 70 (see FIG. 4) and a sound pressure generating unit 80 (see FIG. 4) are further included in the vacuum chamber system so that the sound pressure is operated to the interior of the vacuum chamber 60. Their detailed descriptions will be described later in FIGS. 4 to 6.

Figure 3:
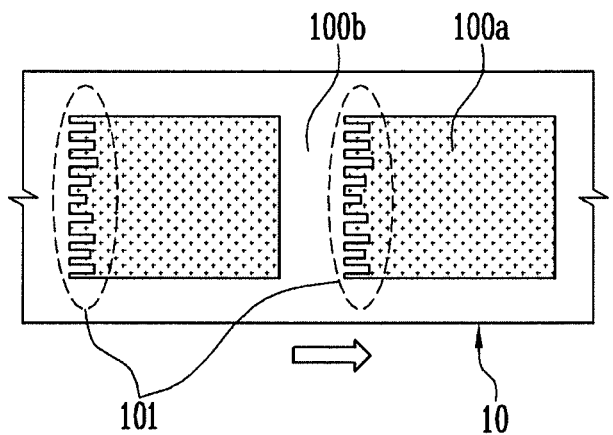
FIG. 3 is a plan view showing a state that an attraction phenomenon occurs at an end of a coating portion, from which a non-coating portion is started.

FIG. 3 is a plan view showing a state that an attraction phenomenon occurs at an end of a coating portion, from which a non-coating portion is started.

Referring to FIG. 3, in a case where continuous coating is performed using the coating apparatus having the vacuum chamber system of FIG. 2B attached thereto, it is smoothly performed by the operation of the sound pressure. However, in a case where intermittent coating is performed using the coating apparatus having the vacuum chamber system of FIG. 2B attached thereto, an attraction phenomenon 101 of the coating solution occurs as shown in FIG. 3.

In a case where, the opening/closing of the coating solution outlet 32 is controlled using an intermittent valve for performing the intermittent coating, a coating portion 100a and a non-coating portion 100b are alternately formed on the base material 10. Here, the non-coating portion 100b is a section in which the coating is not performed. That is, the coating portion 100a is intermittently formed.

The reason why the attraction phenomenon 101 occurs is that the coating solution is attracted to the inside of the coating solution outlet 32 when the intermittent valve is closed. In this instance, the sound pressure operated in the vacuum chamber prevents the intermittent valve from attracting the coating solution. As a result, the attraction phenomenon occurs at every portion at which the intermittently coated coating portion 100a is finished.

Figure 4:
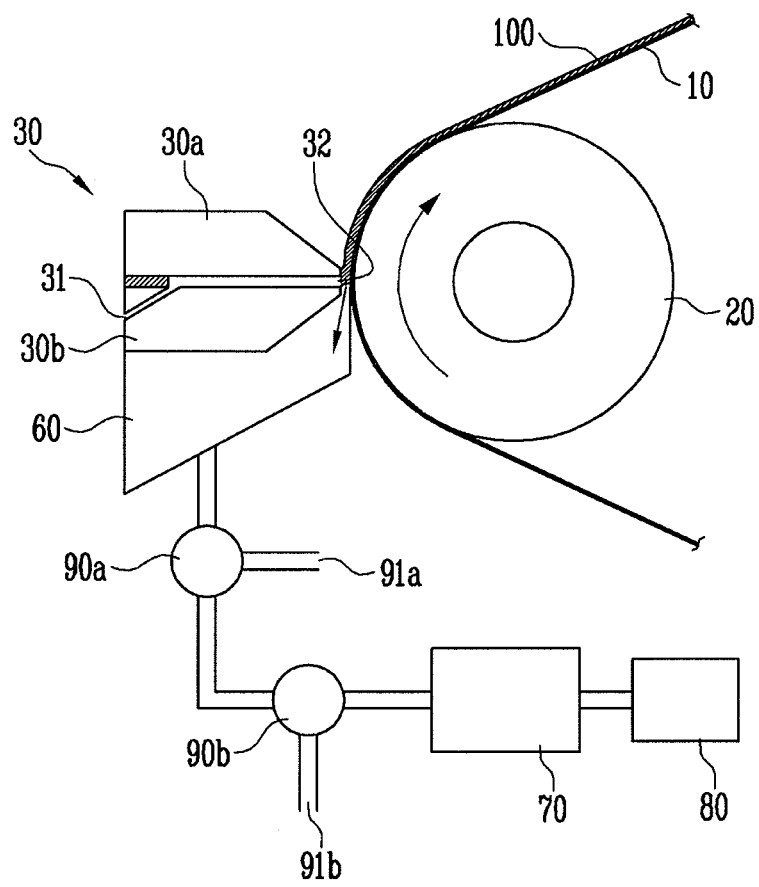
FIG. 4 is a sectional view showing a vacuum chamber system of a coating apparatus according to an embodiment of the present invention.

FIG. 4 is a sectional view showing a vacuum chamber system of a coating apparatus according to an embodiment of the present invention.

Referring to FIG. 4, the vacuum chamber system of the coating apparatus according to this embodiment includes a vacuum chamber 60, a buffer tank 70, a sound pressure generating unit 80 and control units 90a and 90b.

The vacuum chamber 60 is connected to a coating solution outlet 32 of the coating apparatus 30. The buffer tank 70 is connected to one region of the vacuum chamber 60 through a pipe or the like, and the sound pressure generating unit 80 is also connected to the buffer tank 70 through a pipe or the like.

The coating apparatus 30 will be briefly described. The coating apparatus 30 includes a first body portion 30a, a second body portion 30b, a coating solution inlet 31 and a coating solution outlet 32. The first and second body portions 30a and 30b are assembled with a certain gap interposed therebetween, and one side of the gap may be the coating solution outlet 32.

A coating solution supply unit (not shown) may be provided to the coating solution inlet 31, and the coating solution inlet 31 may be extended to a coating solution flow path connected to the gap. A material 10 is transferred in a fixed direction by a roll 20 at the side of the coating solution outlet 32, and coating is performed by a coating solution 100 sprayed from the coating solution outlet 32.

The sound pressure generating unit 80 is formed as a fan or the like, and generates sound pressure to supply the sound pressure to the vacuum chamber 60 via the buffer tank 70.

Here, the sound pressure refers to pressure lower than the air pressure, and the coating solution 100 sprayed through the coating solution outlet 32 connected to the vacuum chamber 60 is influenced by the sound pressure.

The buffer tank 70 may temporarily absorb the sound pressure generated from the sound pressure generating unit 80 in the operation of the control units 90a and 90b which will be described below. That is, the buffer tank 70 may be a pressure or shock-absorbing tank that temporarily absorbs pressure generated in the operation of the control units 90a and 90b. Accordingly, unstable sound pressure can be stabilized in the buffer tank 70 to supply the stabilized sound pressure to the vacuum chamber 60.

The control units 90a and 90b may be further provided between the vacuum chamber 60 and the buffer tank 70. The control units 90a and 90b may be operated so that air is selectively inhaled or blocked from the vacuum chamber 60 and the sound pressure generating unit 80.

The control units may be formed with first and second control units 90a and 90b operated so that air is inhaled or blocked from the vacuum chamber 60 and the sound pressure generation unit 80. The control units 90a and 90b may be formed as 3-way switching valves. In this instance, the 3-way switching valve may be operated manually or automatically.

Figure 5:
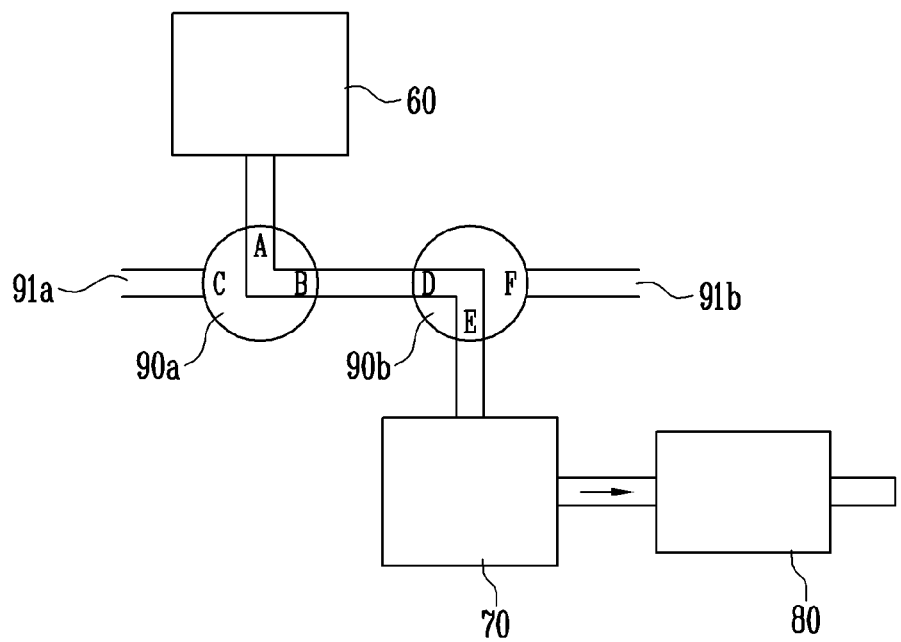
FIG. 5 is a block diagram showing a state that air is not inhaled to the vacuum chamber system of the coating apparatus according to the embodiment of the present invention.

FIG. 5 is a block diagram showing a state where air is not inhaled into the vacuum chamber system of the coating apparatus according to the embodiment of the present invention.

Referring to FIG. 5, in a case where coating is intermittently performed using the vacuum chamber system of the coating apparatus according to this embodiment, the sound pressure of the vacuum chamber 60 may be supplied or blocked by controlling the first and second control units 90a and 90b.

In a case where a coating portion 100a (see FIG. 7) is formed, the first and second control units 90a and 90b are controlled in the state where air is blocked from the vacuum chamber 60 and the sound pressure generating unit 80 so that the sound pressure is operated to the vacuum chamber 60.

In this instance, the first control unit 90a may be controlled so that the vacuum chamber 60 is connected to the sound pressure generating unit 80. The first control unit 90a may control openings/closings in three directions A, B and C: the vacuum chamber 60 (A), the sound pressure generating unit 80 (B) and a first air supply unit 91a (C). That is, while the coating portion 100a is formed, the first control unit 90a may open A and B and close C.

The second control unit 90b may also be controlled so that the vacuum chamber 60 is connected to the sound pressure generating unit 80. The second control unit 90b may control openings/closings in three directions D, E and F: the vacuum chamber 60 (D), the sound pressure generating unit 80 (E) and a second air supply unit 91b (F). That is, while the coating portion 100a is formed, the second control unit 90b may open D and E and close F.

Accordingly, the sound pressure can be formed in the vacuum chamber 60 when the coating portion 100a is formed.

Figure 6:
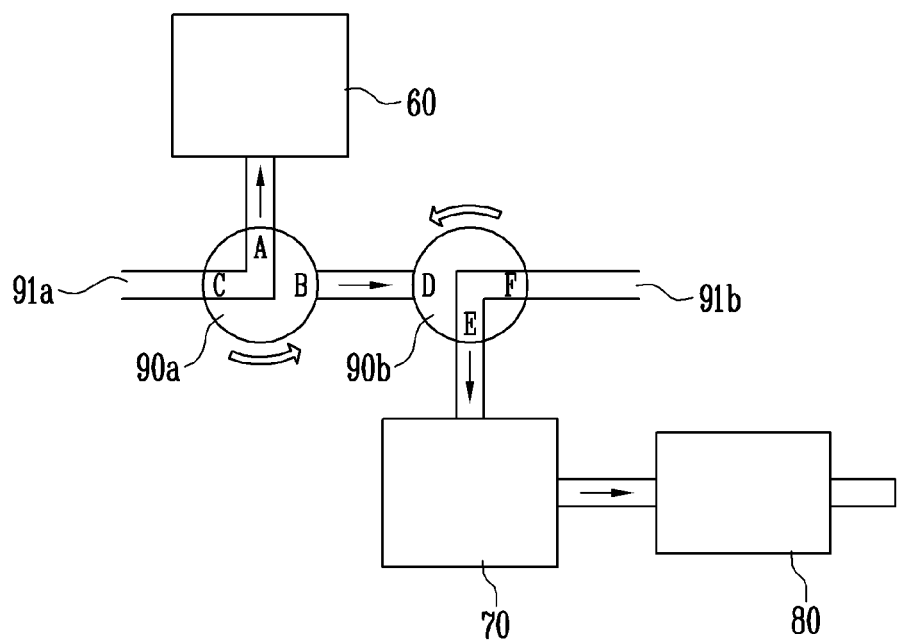
FIG. 6 is a block diagram showing a state that air is inhaled to the vacuum chamber system of the coating apparatus according to the embodiment of the present invention.

FIG. 6 is a block diagram showing a state where air is inhaled into the vacuum chamber system of the coating apparatus according to the embodiment of the present invention.

Referring to FIG. 6, in a case where a non-coating portion 100b (see FIG. 7) is formed, the first and second control units 90a and 90b are controlled in the state where air is independently inhaled into the vacuum chamber 60 and the sound pressure generating unit 80.

In this instance, the first control unit 90a may control the air to be inhaled into the vacuum chamber 60 while blocking the vacuum chamber 60 and the sound pressure generating unit 80. The first control unit 90a may control the openings/closings in the three directions A, B and C: the vacuum chamber 60 (A), the sound pressure generating unit 80 (B) and the first air supply unit 91a (C). That is, while the non-coating portion 100b is formed, the first control unit 90a may control the air to be inhaled by opening A and C and closing B.

The second control unit 90b may control the air to be independently inhaled into the buffer tank 70 and the sound pressure generating unit 80 while blocking the vacuum chamber 60 and the sound pressure generating unit 80. The second control unit 90b may control the openings/closings in the three directions D, E and F: the vacuum chamber 60 (D), the sound pressure generating unit 80 (E) and the second air supply unit 91b (F). That is, while the non-coating portion 100b is formed, the second control unit 90b may control the air to be inhaled by opening E and F and closing D.

Figure 7:
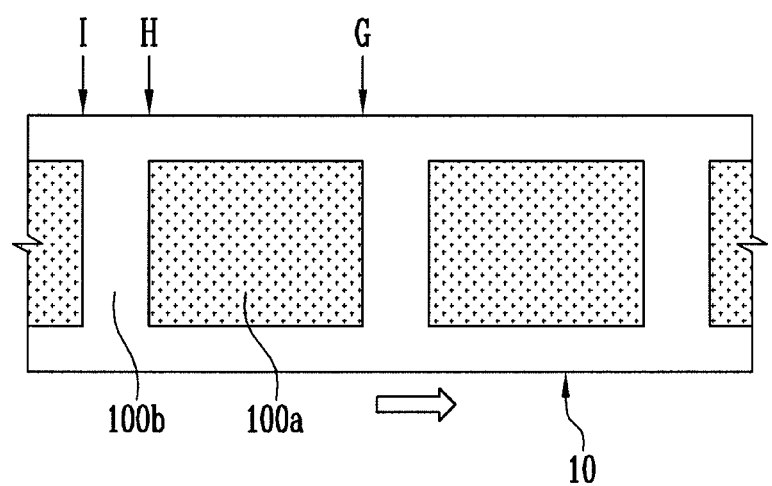
FIG. 7 is a plan view showing a state a material is coated using the vacuum chamber system of the coating apparatus according to the embodiment of the present invention.

FIG. 7 is a plan view showing a state a material is coated using the vacuum chamber system of the coating apparatus according to the embodiment of the present invention.

Referring to FIG. 7, a coating solution is intermittently coated on a base material. In this instance, the base material 10 is transferred from the left to the right, and a coating portion 100a and a non-coating portion 100b are alternately formed. If coating is performed using the vacuum chamber system of the coating apparatus according to this embodiment, an attraction phenomenon is less likely to occur at an end portion H of the coating portion 100a as shown in FIG. 7.

As described in FIGS. 5 and 6, while the coating portion 100a is formed (G to H), the first and second control units 90a and 90b control the air to be blocked from the vacuum chamber 60 and the sound pressure generating unit 80. While the non-coating portion 100b is formed (H to I), the first and second control units 90a and 90b control the air to be independently inhaled into the vacuum chamber 60 and the sound pressure generating unit 80. Accordingly, it is possible to prevent the attraction phenomenon from occurring at the end portion H of the coating portion 100a.

Exemplary Embodiment

In intermittent coating using the vacuum chamber system of the coating apparatus according to this embodiment, the intermittent coating is performed in a coating thickness of 100 μm at a coating speed of 5.3 m/min using a slurry with a viscosity of 1500 cPs. In this instance, the coating portion 100a has a width of 5 m and the non-coating portion 100b has a width of 1 m.

In a case where the vacuum chamber 60 is not used, the length of the end portion of the coating portion 100a at which the attraction phenomenon occurs is less than 0.5 mm, which is very small. However, in a case where the intermittent coating is performed using the vacuum chamber 60, the length of the end portion of the coating portion 100a at which the attraction phenomenon occurs is about 2 mm. In this instance, the sound pressure of the vacuum chamber 60 is 0.3 kPa.

In order to improve the attraction phenomenon that occurs at the end portion of the coating portion 100a, coating is performed using the vacuum chamber system according to this embodiment, and the attraction length of the end portion of the coating portion 100a is measured. The measured attraction length of the end portion of the coating portion 100a is 0.5 mm, which is restored to the attraction length when the vacuum chamber 60 is not used.

Hereinafter, the operation of the vacuum chamber system of the coating apparatus according to this embodiment will be described.

In the vacuum chamber system of the coating apparatus, the first and second control units 90a and 90b are provided between the vacuum chamber 60 and the buffer tank 70. The first and second control units 90a and 90b control the air to be independently inhaled to the vacuum chamber 60 and the sound pressure generating unit 80.

The first and second control units 90a and 90b may be automatically configured to operate in conjunction with an intermittent coating process. When the coating is performed, air is not inhaled into the vacuum chamber 60 and the sound pressure generating unit 80, but sound pressure is formed in the vacuum chamber 60. That is, the air in the vacuum chamber 60 is attracted to the side of the sound pressure generating unit 80.

When a coating solution is blocked to perform the intermittent coating, the first and second control units 90a and 90b control the air to be independently inhaled into the vacuum chamber 60 and the sound pressure generating unit 80. That is, the air is independently inhaled into the vacuum chamber 60 and the sound pressure generating unit 80, so that the air in the vacuum chamber 60 is not inhaled into the sound pressure generating unit 80. In this instance, the air of the first air supply unit 91a connected to the first control unit 90a is inhaled into the vacuum chamber 60 so that the sound pressure is removed. The air of the second air supply unit 91b connected to the second control unit 90b is inhaled into the sound pressure generating unit 80.

Here, it is likely that an offset is provided at the times when the first and second control units 90a and 90b are on/off, respectively. Accordingly, a unit for finely adjusting the times when the first and second control units 90a and 90b are on/off, respectively, may be additionally provided.

In a case where a coating portion 100a and a non-coating portion 100b are formed through the aforementioned process and a coating portion 100a is the formed again, coating is performed in the state that the positions of the first and second control units 90a and 90b is returned to the original positions, respectively.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A vacuum chamber system of a coating apparatus, the system comprising:
    a vacuum chamber connected to a coating solution outlet of the coating apparatus;
    a sound pressure generating unit connected to one region of the vacuum chamber to generate sound pressure; and
    a buffer tank provided between the vacuum chamber and the sound pressure generating unit,
    wherein first and second control units are further provided between the vacuum chamber and the buffer tank, and the first and second control units are configured to control air to be selectively inhaled into or blocked from the vacuum chamber and the sound pressure generating unit,
    wherein the first and second control units are physically connected to the vacuum chamber and the buffer tank,
    wherein the first and second control units in a first orientation are configured to block air from entering the vacuum chamber and connects the vacuum chamber to the buffer tank so that the sound pressure is provided to the vacuum chamber during coating, and
    wherein the first and second control units in a second orientation are configured to permit a first air flow into the vacuum chamber and a second air flow into the buffer tank, and wherein the first and second control units in the second orientation are further configured to block the sound pressure between the vacuum chamber and the buffer tank during non-coating operations.

2. The system according to claim 1, wherein the first and second control units are each formed as a 3-way switching valve.

3. The system according to claim 2, wherein the 3-way switching valve is operated automatically or manually.

4. The system according to claim 1, wherein the buffer tank temporarily absorbs the sound pressure generated from the sound pressure generating unit during operation of the first and second control units.

5. The system according to claim 1, wherein the sound pressure generating unit comprises a fan.

6. The system according to claim 1, wherein an intermittent unit for at least one of opening and closing the coating solution outlet is further formed at the coating solution outlet.

7. The system according to claim 1, wherein the coating apparatus is used when an active material slurry is coated on a metal base material of a secondary battery.

\* \* \* \* \*